May 24, 1938.    W. H. BASELT    2,118,753
CLASP BRAKE
Filed Dec. 28, 1935    4 Sheets-Sheet 2

Fig. 2.

INVENTOR.
Walter H. Baselt.
BY
ATTORNEYS.

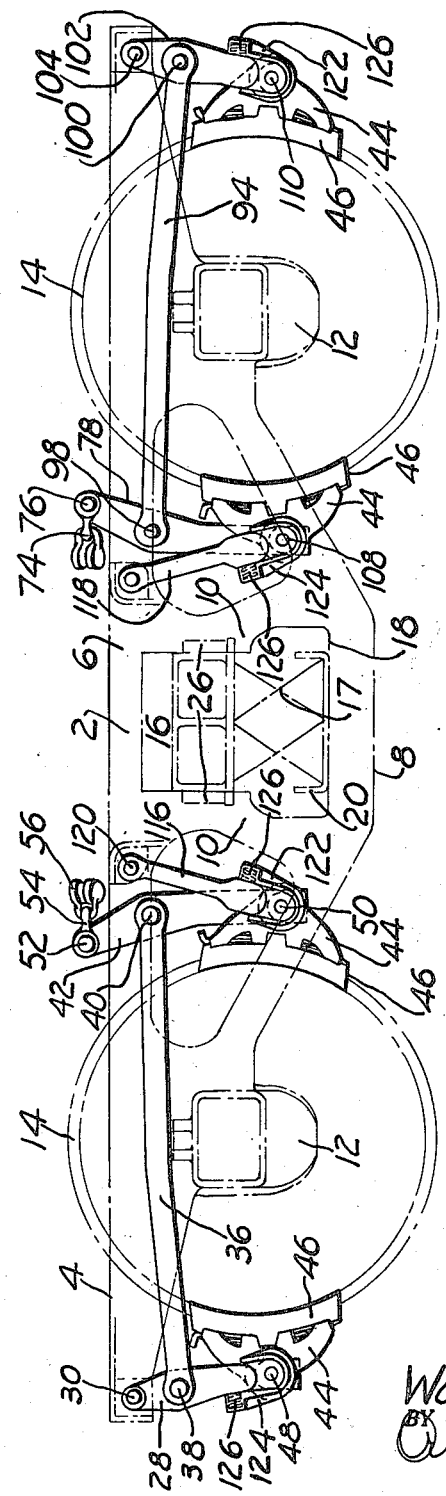

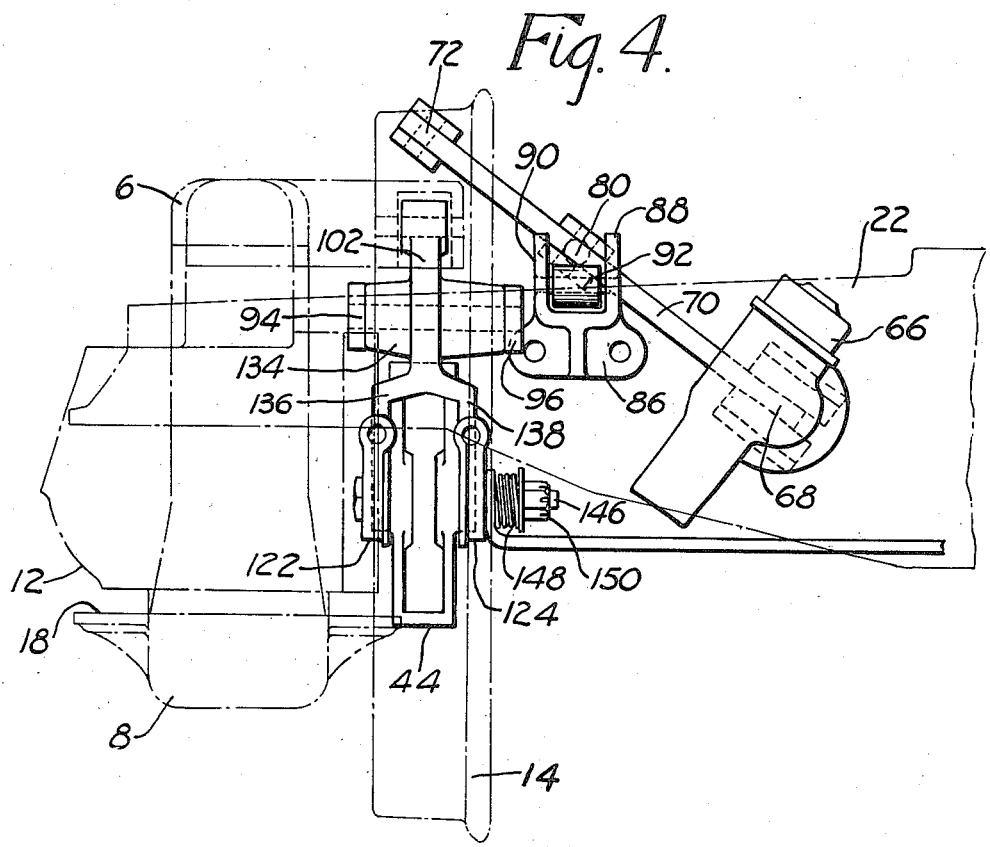

Patented May 24, 1938

2,118,753

UNITED STATES PATENT OFFICE 2,118,753

CLASP BRAKE

Walter H. Baselt, Chicago, Ill., assignor to American Steel Foundries, Chicago, Ill., a corporation of New Jersey Application December 28, 1935, Serial No. 56,514

27 Claims. (Cl. 188—56)

This invention relates to brake rigging for railway car trucks and more particularly to those known as clasp brakes wherein brake heads and brake shoes are applied to both sides of each car wheel.

An object of the invention is to provide a clasp brake design of rigging for a railway car truck in which the operating parts will be as compactly and as simply arranged as possible.

Another object is to provide a novel design of rigging wherein the operating means will be carried in the truck bolster, thereby conserving space and facilitating a simpler design than would be possible otherwise.

A still further object of my invention is to provide a clasp brake rigging for railway cars wherein the power means and the levers connecting said power means to the other operating parts of the rigging are both supported from the same member of the truck frame.

Still another object of my invention is to provide a beamless brake rigging of the clasp type having the power means mounted within the load carrying member of the car truck.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 2 is a transverse sectional view of the truck construction shown in Figure 1, the section being taken substantially in the vertical plane indicated by the line 2—2 of Figure 1;

Figure 3 is a side elevation of the truck construction shown in Figure 1; and

Figure 4 is an end elevation of the truck construction shown in Figure 1, the view being taken substantially at the right end of the truck as viewed in Figure 1.

Figure 1:
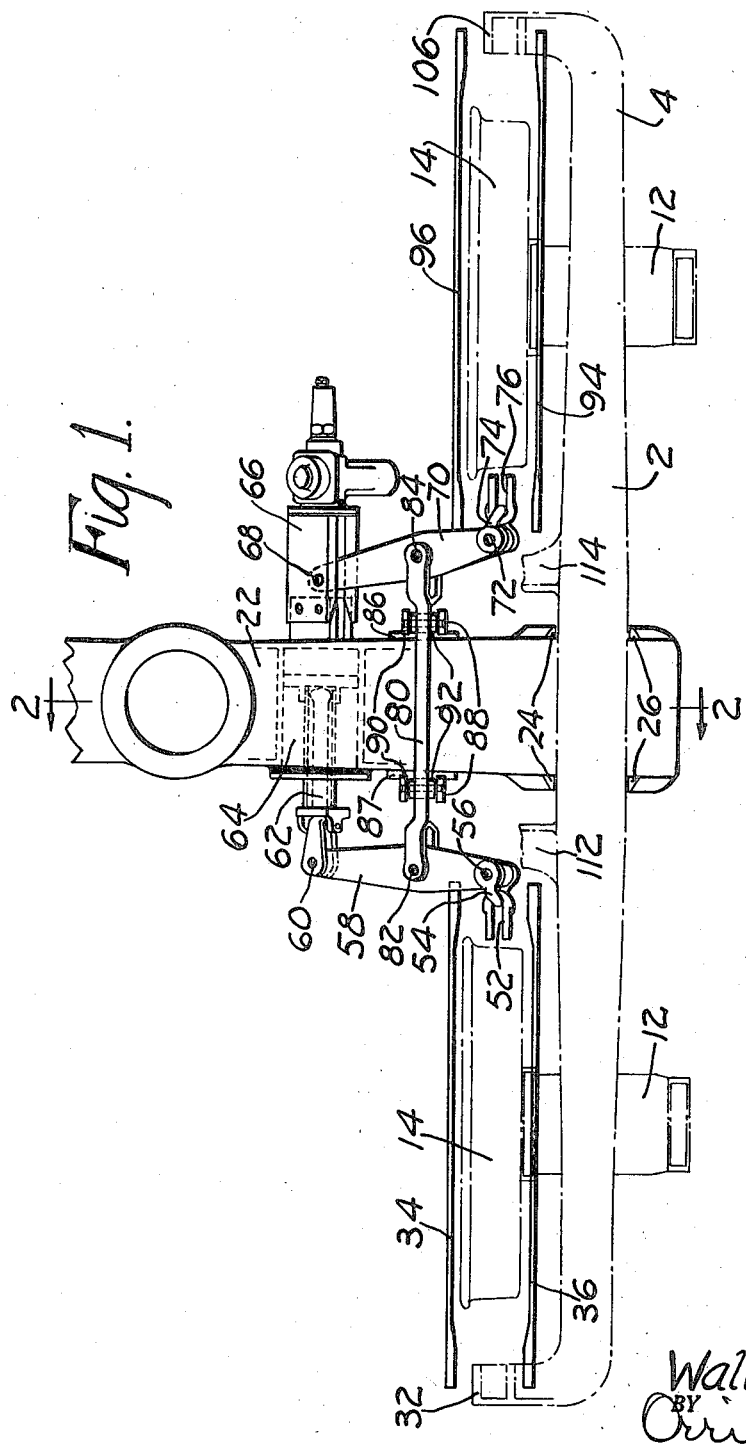
Figure 1 is a top plan view of a railway car truck embodying my invention. In this view, as in the other views, only one-half of the car truck is shown inasmuch as the structure is similar on the two sides of the truck and it is believed that the simplicity thus attained will facilitate understanding of the invention.

Describing my invention in more detail, the car truck generally designated as 2 has side frames 4 comprising the compression member 6 and the tension member 8 joined by the integral column guides 10 and connected at their ends to the integrally formed journal boxes 12 providing cooperation in the usual manner with the associated wheel and axle assemblies 14. At the middle portion of the side frame 4 the window opening 16 is formed between the tension member 6 and the compression member 8 and the column guides 10 in the usual manner with the spring seat portion 18 to which the spring plank 20 may be secured for the purpose of maintaining the side frames on the opposite sides of the truck in squared relation. The load carrying member 22, in this case shown as a bolster, cooperates with the side frames 4 in the usual manner by extending through the window opening 16 resting upon resilient means 17 (diagrammatically shown), and having cooperation with the columns by means of the integrally formed lugs 24 and 26 located respectively inwardly and outwardly of the side frame.

It will be understood that the spring plank 20 might be omitted if desired inasmuch as truck constructions are in common use wherein the bolster serves as the means for holding the truck square and the spring plank is omitted altogether where simplicity and light weight are particularly desired.

In this embodiment of my invention brake rigging is shown as consisting of the dead lever 28 (left end of Figure 3) pivotally supported from its upper end as at 30 from the bracket 32 integrally formed on the side frame 4. Inner and outer straps 34 and 36 may be pivotally connected as at 38 to a point intermediate the ends of the dead lever 28 and extend over the axle, making a pivotal connection at their opposite ends as at 40 to a point intermediate the ends of the live truck lever 42. Brake heads 44 with the associated brake shoes 46 may be pivotally and adjustably supported as at 48 and 50 on the lower ends of the dead lever 28 and the live lever 42 respectively.

The upper end of the live lever 42 is pivotally connected as at 52 to the clevis means 54 which is in turn pivotally connected as at 56 to the diagonally arranged live cylinder lever 58 (see Figure 2), the opposite end of the live cylinder lever being pivotally connected as at 60 to the piston rod 62 of the cylinder 64 integrally formed in the body of the bolster 22. Secured on the opposite end of the cylinder 64 is the automatic slack adjuster 66 having a pivotal and adjustable connection as at 68 to one end of the diagonally arranged dead cylinder lever 70, the opposite end of the dead cylinder lever 70 being pivotally connected as at 72 to the clevis means 74 and the clevis means 74 is pivotally connected as at 76 to the upper end of the live truck lever 78. Figure 4 shows very clearly how such an arrangement of the cylinder levers provides maximum vertical clearance conditions. In such a construction wherein the power means is contained within the bolster or load carrying member itself, maximum clearance is provided above the load carrying member for the structure of the car body.

The pull rod 80 has one end pivotally connected as at 82 to the live cylinder lever 58 and a pivotal connection as at 84 at its opposite end to the dead cylinder lever 70. The pull rod 80 is supported on the bolster 22 by means of brackets 86 and 87 integrally formed or otherwise mounted on the bolster 22. Each of these brackets is formed with upwardly projecting flanges 88 and 90 between which is mounted the anti-friction roller 92 to facilitate the sliding movement of the pull rod 80.

Straps 94 and 96, connected at one end as at 98 to the live lever 78 and extending above the axle, are pivotally connected at their opposite ends as at 100 to the dead truck lever 102. The dead truck lever 102 is pivotally supported as at 104 from the bracket 106 integrally formed on the side frame 4. At the lower ends of live lever 78 and dead lever 102 are pivotally and adjustably supported as at 108 and 110 respectively brake heads 44 with their associated brake shoes 46.

Brake hanger brackets 112 and 114 are integrally formed on the side frame 4 intermediate the wheels and provide support for the brake hangers 116 and 118. The arrangement of these hangers is most clearly shown in Figure 2 where hanger 116 is shown to consist of identical halves 117 and 119 pivotally supported at their upper ends as at 120 and having a connection at the pivotal point 50 to the brake head 44 which is supported between them. Left and right friction lever arms 122 and 124 provide housings for springs 126 (Figure 3) and are maintained in assembly with the hanger parts 117 and 119 as well as with the brake head 44 and the live lever 42 by means of the threaded bolt 128, the spring 130 and the threaded nut 132 in a manner which is described in detail in applicant's co-pending application bearing Serial No. 651,864 and filed January 16, 1933. This assembly provides an automatically adustable brake head balancing device as well as a connection for the various parts. The brake heads outwardly of the wheels are supported at the lower ends of the dead levers 28 and 102 respectively in a manner most clearly shown in Figure 4 wherein it is seen that the dead lever 102 has a trunnion-like portion 134 providing a convenient connection for the straps 94 and 96. The lower portion of the lever 102 is bifurcated to form the legs 136 and 138 upon which are mounted the right and left friction lever arms 124 and 122 respectively, and between which is mounted the brake head 44, the whole being maintained in assembly by the threaded bolt 146, the spring 148 and the nut 150 in a structure similar to that just described and set out in detail in applicant's co-pending application previously identified.

In operation, actuation of the power means 64 will move to the left as viewed in Figure 1, the piston 62 thus rotating the live cylinder lever 58 in a counter-clockwise direction about the pivot 82, the movement of the outer end of said live cylinder lever 58 being transmitted to the truck lever 42 through the clevis means 54, thus rotating the live lever 42 in a clockwise direction about the pivot point 40 until the brake shoe 46, mounted on the brake head 44 and carried at the lower end of the live lever 42, is brought into bearing against the periphery of the associated wheel. As movement continues the lever 42 will rotate in a clockwise direction about the pivot point 50 thus moving to the right the pull rod 36 and causing the dead lever 28 to rotate in a counter-clockwise direction about the pivot point 30 thus bringing into bearing against the periphery of the said wheel the brake shoe 46 mounted on the brake head 44 at the opposite side of the wheel and supported on the lower end of the dead lever 28.

Continued movement of the piston 62 will cause the live cylinder lever 58 to pivot in a counter-clockwise direction about the point 56 thus moving to the left pull rod 80 and rotating the dead cylinder lever 70 in a clockwise direction about the pivot point 68. This movement of the dead cylinder lever 70 is transmitted to the live truck lever 78 through the clevis means 74 thus rotating the live lever 78 in a counter-clockwise direction about the pivot point 98 and bringing into bearing against the wheel at the other end of the truck the brake shoe 46, mounted on the brake head 44 which is supported at the lower end of the live lever 78. Further movement causes rotation of the lever 78 in a counter-clockwise direction about the pivot point 108 thus moving the pull rod 94 to the left and causing clockwise rotation of the dead lever 102 about the pivot 104 and bringing the brake shoe 46 mounted on the brake head 44 and carried at the lower end of the dead lever 102 into bearing against the opposite side of the periphery of the wheel at this end of the car truck. Release of the power means causes release of the brake mechanism by a movement of the various parts in reverse directions to those described when the power means is actuated.

Slack takeup, which results from the wear on the wheel treads and on the brake shoes, is provided for by the slack adjuster 66 which automatically alters the position of the pivot point 68 as slack develops.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a clasp brake rigging for four wheel railway car trucks, the combination of a truck frame, dead truck levers supported on said frame outwardly of the wheels, live truck levers supported from said frame intermediate the wheels, straps connecting the live and dead levers for each wheel, brake heads pivotally and adjustably supported from the lower ends of said live and dead truck levers, brake hangers having their upper ends pivotally connected to said truck frame intermediate the wheels and their lower ends connected to said live levers at the said pivotal point where said brake heads are supported, diagonally arranged live and dead cylinder levers operatively connected at their outer ends to the upper ends of said live truck levers and connected intermediate their ends by a pull rod, and power means integrally formed within said truck frame and comprising an actuating member connected to said live cylinder lever at one end of said power means and slack adjusting means mounted at the opposite end of said power means, said slack adjuster being pivotally and adjustably connected to said dead cylinder lever.

2. In a brake rigging for a railway car truck, the combination of a truck frame comprising side frame members and a load carrying member connecting said side frame members, power means integrally formed within said load carrying member, live and dead truck levers supported at opposite sides of each car wheel, straps connecting the live and dead truck levers for each car wheel, brake heads pivotally and adjustably connected at the lower ends of said live and dead truck levers, diagonally arranged live and dead cylinder levers anti-frictionally supported on said load carrying member by a pull rod connecting said cylinder levers at points intermediate their ends, operative connections between the outer ends of said live and dead cylinder levers and the upper ends of said live truck levers, actuating means at one end of said power means operatively connected to the inner end of said live cylinder lever, and slack adjusting means mounted at the opposite end of said power means and operatively connected to the inner end of said dead cylinder lever.

3. In a brake rigging for four wheel railway car trucks, the combination of a truck frame comprising side frame members and a load carrying member connecting said side frame members, wheel and axle assemblies operatively associated with said side frame members, dead truck levers supported from said side frame members outwardly of said wheels, live truck levers supported intermediate said wheels, straps extending above the axles and connecting the live and dead truck levers for each wheel, hangers having their upper ends supported on said side frame members and their lower ends pivotally connected at the lower ends of said live truck levers, and diagonally arranged live and dead cylinder levers connected together and having their outer ends connected to the upper ends of said live truck levers and their inner ends operatively connected to the opposite ends of power means, said power means being integrally formed within the body of said load carrying member.

4. In a brake rigging for a four wheel railway car truck, the combination of a truck frame comprising side frame members and a load carrying member supported on and connecting said side frame members, wheel and axle assemblies journaled in said side frame members, brackets integrally formed on said side frame members outwardly of said wheels, dead truck levers having their upper ends pivotally connected to said brackets and brake heads pivotally supported at their lower ends, live truck levers supported intermediate said wheels, straps connecting said live and dead truck levers inwardly and outwardly of each wheel and passing above the associated axle, and clevis means connecting the upper ends of said live truck levers to diagonally disposed live and dead cylinder levers, said diagonally arranged cylinder levers being connected to each other and operatively connected to opposite ends of power means, said power means being integrally formed within said load carrying member.

5. In clasp brake rigging, the combination of a truck frame including side members and a transverse load carrying member, power means integrally formed within said load carrying member, live and dead truck levers supported on opposite sides of each car wheel, hangers pivotally connected to the lower ends of said live truck levers and diagonally arranged live and dead cylinder levers having their outer ends operatively connected to said live truck levers and a connection with each other intermediate their ends, said live cylinder lever having a connection with said power means for operation of said brake rigging and said dead cylinder lever having a connection at the opposite end of said power means for automatic adjustment of slack.

6. In a brake rigging for a four wheel railway car truck, the combination of a truck frame having side frame members, a load carrying member supported on and connecting said side frame members, wheel and axle assemblies journaled in said side frame members, power means integrally formed within each half of said load carrying member for operation of brake rigging on the opposite sides of said car truck, said rigging comprising dead truck levers supported from said truck frame outwardly of said wheels, live truck levers supported intermediate said wheels, straps connecting said truck levers for each wheel and diagonally arranged cylinder levers connected to each other and operatively connected at their outer ends to said live truck levers and at their inner ends to the opposite ends of one of said power means.

7. In a brake rigging for a four wheel railway car truck, the combination of a truck frame having side frame members, a load carrying member supported on and connecting said side frame members, wheel and axle assemblies journaled in said side frame members, power means integrally formed within each half of said load carrying member for operation of brake rigging on the opposite sides of said car truck, said rigging comprising dead truck levers supported from said truck frame outwardly of said wheels, live truck levers supported intermediate said wheels, straps connecting said truck levers, diagonally arranged cylinder levers operatively connected at their outer ends to said live truck levers and at their inner ends to the opposite ends of one of said power means, and a pull rod having its opposite ends connected to said cylinder levers, said pull rod being anti-frictionally supported on said load carrying member.

8. In a brake rigging for a four wheel railway car truck, the combination of a truck frame having side frame members, a load carrying member supported on and connecting said side frame members, wheel and axle assemblies journaled in said side frame members, and power means integrally formed within each half of said load carrying member for operation of brake rigging on the opposite sides of said car truck, said rigging comprising dead truck levers supported from said truck frame outwardly of said wheels, live truck levers supported intermediate said wheels and brake heads pivotally and adjustably connected at the lower ends of each of said live and dead truck levers.

9. In a brake rigging for a four wheel railway car truck, the combination of a truck frame having side frame members, a load carrying member supported on and connecting said side frame members, wheel and axle assemblies journaled in said side frame members, and power means integrally formed within each half of said load carrying member for operation of brake rigging on the opposite sides of said car truck, said rigging comprising dead truck levers supported from said truck frame outwardly of said wheels, live truck levers supported intermediate said wheels, straps connecting said truck levers, hangers supported at their upper ends on said side frame members intermediate the wheels and supporting said rigging intermediate the wheels through pivotal connections at the lower ends of said live truck levers and diagonally arranged cylinder levers connected to each other and operatively connected at their outer ends to said live truck levers and at their inner ends to the opposite ends of one of said power means.

10. In a brake rigging for a four wheel railway car truck, the combination of a truck frame having side frame members, a load carrying member supported on and connecting said side frame members, wheel and axle assemblies journaled in said side frame members, power means integrally formed within each half of said load carrying member for operation of said load carrying member for operation of brake rigging on the opposite sides of said car truck, live and dead truck levers supported on said side frame members at opposite sides of each car wheel and operatively connected at points intermediate their ends by straps, brake heads pivotally and adjustably supported from the lower ends of said live and dead truck levers, diagonally arranged live and dead cylinder levers operatively connected at their outer ends to the upper ends of said live truck levers, a pull rod anti-frictionally supported on said load carrying member and having its opposite ends connected to said live and dead cylinder levers, actuating means at one end of said power means operatively connected to said live cylinder lever, and slack adjusting means mounted at the opposite end of said power means, said slack adjusting means having a pivotal and adjustable connection with said dead cylinder lever.

11. In brake rigging for a four wheel railway car truck, the combination of a truck frame comprising side frames having integrally formed tension and compression members, integral journal boxes, column guides integrally connecting said tension and compression members intermediate their ends and forming window openings, a load carrying member having its ends received within said window openings and resiliently supported on said side frame members, power means integrally formed in each half of said load carrying member on opposite sides of the longitudinal center line of said truck for operation of brake rigging at the opposite sides of said truck, said brake rigging comprising dead levers supported outwardly of said wheels, live levers supported inwardly of said wheels, brake heads supported at the lower ends of all of said truck levers, straps connecting the live and dead truck levers for each wheel, and diagonally arranged cylinder levers connected to each other and operatively connected at corresponding ends to said live truck levers and operatively connected at their opposite ends to opposite ends of one of said power means.

12. In a clasp brake rigging the combination of a truck frame including side members and a transverse load carrying member, power means integrally formed in said load carrying member, live and dead truck levers supported at opposite sides of each car wheel, straps connecting said levers for each wheel, and diagonally arranged cylinder levers connected at their outer ends to said live truck levers and connected intermediate their ends to each other, the inner end of one of said cylinder levers being connected to said power means for actuation of said brake rigging and the inner end of the other of said cylinder levers being operatively connected to the opposite end of said power means for automatic adjustment of slack.

13. In a brake rigging for a four wheel railway car truck, the combination of a truck frame comprising side frames having integrally formed tension and compression members, integral journal boxes, column guides integrally connecting said tension and compression members intermediate their ends and forming window openings, a load carrying member having its ends received within said window openings and resiliently supported on said side frame members, power means integrally formed in each half of said load carrying member on opposite sides of the longitudinal center line of said truck for operation of brake rigging at the opposite sides of said truck, said brake rigging comprising live and dead truck levers supported at opposite sides of each car wheel, live and dead cylinder levers supported intermediate the wheels and operatively connected to the upper ends of said live truck levers, and a pull rod anti-frictionally supported on said load carrying member and connected at its opposite ends to said live and dead cylinder levers at points intermediate their ends, said live cylinder lever being operatively connected to actuating means at one end of said power means and said dead cylinder lever being operatively connected to slack adjusting means at the opposite end of said power means.

14. In a clasp brake rigging, the combination of a truck frame including side members and a load carrying member, power means integrally formed within said load carrying member, wheel and axle assemblies journaled in said side members, live and dead truck levers supported from said side members on opposite sides of each car wheel, and live and dead cylinder levers tied intermediate their ends and connected at their outer ends to said live truck levers and at their inner ends to the opposite ends of said power means.

15. In a brake rigging for a four wheel railway car truck the combination of a truck frame comprising side frames having integrally formed tension and compression members, integral journal boxes, column guides integrally connecting said tension and compression members intermediate their ends and forming window openings, a load carrying member having its ends received within said window openings and resiliently supported on said side frame members, power means integrally formed in each half of said load carrying member on opposite sides of the longitudinal center line of said truck for operation of brake rigging at opposite sides of said truck, said brake rigging comprising live and dead truck levers supported at opposite sides of each car wheel, straps connecting the live and dead truck levers for each wheel, said straps passing respectively outwardly and inwardly of the wheel, brake heads pivotally and adjustably supported at the lower ends of all of said truck levers, diagonally arranged cylinder levers tied intermediate their ends and operatively connected at their outer ends to the upper ends of said live truck levers and operatively connected at their inner ends to opposite ends of one of said power means.

16. In clasp brake rigging, the combination of a car truck including side members and a transverse load carrying member, power means integrally formed within said load carrying member, live and dead truck levers supported on opposite sides of each car wheel, hangers pivotally connected to the lower ends of said live truck levers and diagonally arranged interconnected cylinder levers having their outer ends connected to said live truck levers and their inner ends operatively connected to said power means.

17. In clasp brake rigging, the combination of a truck frame including a transverse load carrying member, wheel and axle assemblies journaled in said frame, live and dead truck levers supported at opposite sides of each car wheel, hanger levers pivotally connected to the lower ends of said live truck levers, a diagonally arranged live cylinder lever having its outer end connected to one of said live truck levers and its inner end connected to power means formed within said load carrying member for operation of said brake rigging and a diagonally arranged dead cylinder lever having its outer end connected to another of said live truck levers and its inner end operatively connected to said power means for automatic adjustment of slack, and a pull rod connecting said cylinder levers intermediate their ends.

18. In clasp brake rigging, the combination of a truck frame including a transverse load carrying member, wheel and axle assemblies journaled in said frame, live and dead truck levers supported on opposite sides of each car wheel and connected at points intermediate their ends by straps inwardly and outwardly of each wheel, live and dead cylinder levers having their outer ends operatively connected to said live truck levers and their inner ends connected to the opposite ends of power means formed within said load carrying member, and a pull rod connecting said cylinder levers intermediate their ends.

19. In clasp brake rigging, the combination of a four wheel truck having a transverse load carrying member, power means integrally formed therein, live and dead truck levers supported on opposite sides of each car wheel, hanger levers supporting said live truck levers, and interconnected cylinder levers connected at their outer ends to said live truck levers and at their inner ends to the opposite ends of said power means respectively for actuation of said brake rigging and adjustment of slack therein.

20. In combination, a four wheel railway car truck having a truck frame with side members and a load carrying member, power means integrally formed within said load carrying member, live and dead truck levers supported from said side members on opposite sides of each car wheel, live and dead cylinder levers having corresponding ends connected respectively to the opposite ends of said power means for operation of said rigging, said cylinder levers having their opposite corresponding ends connected to said live truck levers, and a pull rod anti-frictionally supported on said load carrying member and connecting said cylinder levers intermediate their ends.

21. In a clasp brake rigging, the combination of a four wheel railway car truck comprising side members and a transverse load carrying member, power means integrally formed within said load carrying member, dead truck levers pivotally supported outwardly of said wheels, live truck levers pivotally supported adjacent their lower ends intermediate said wheels, and interconnected live and dead cylinder levers having their corresponding ends connected respectively to opposite ends of said power means and to said live truck levers.

22. In a clasp brake rigging, the combination of a four wheel railway car truck comprising side members and a transverse load carrying member, power means integrally formed within said load carrying member, dead truck levers pivotally supported outwardly of said wheels, live truck levers pivotally supported adjacent their lower ends intermediate said wheels, live and dead cylinder levers having their corresponding ends connected respectively to opposite ends of said power means and to said live truck levers, and a pull rod anti-frictionally supported on said load carrying member and connecting said cylinder levers intermediate their ends.

23. In combination, a four wheel railway car truck with a truck frame comprising a transverse load carrying member, power means integrally formed therein, dead truck levers pivotally supported adjacent their upper ends outwardly of the wheels, live truck levers supported adjacent their lower ends intermediate said wheels, and interconnected live and dead cylinder levers having corresponding ends respectively connected to opposite ends of said power means and their other corresponding ends connected to said live truck levers.

24. In combination, a four wheel railway car truck with a truck frame comprising a transverse load carrying member with integral power means, dead truck levers pivotally supported adjacent their upper ends outwardly of the wheels, live truck levers supported adjacent their lower ends intermediate said wheels, live and dead cylinder levers having corresponding ends respectively connected to opposite ends of said power means and their other corresponding ends connected to said live truck levers, and a pull rod anti-frictionally supported on said load carrying member and connecting said cylinder levers intermediate their ends.

25. In combination, a four wheel railway car truck with a frame comprising a transverse load carrying member, power means integrally formed therein, dead truck levers supported adjacent their upper ends outwardly of the wheels, hangers supported intermediate said wheels, live truck levers supported adjacent their lower ends from said hangers, and interconnected live and dead cylinder levers having corresponding ends connected to opposite ends of said power means and their other correponding ends connected to said live truck levers.

26. In combination, a four wheel railway car truck having a frame comprising a transverse load carrying member, power means integrally formed therein, dead truck levers supported adjacent their upper ends outwardly of the wheels, hangers supported intermediate said wheels, live truck levers supported adjacent their lower ends from said hangers, live and dead cylinder levers having corresponding ends connected to opposite ends of said power means and their other corresponding ends connected to said live truck levers, and a pull rod anti-frictionally supported on said load carrying member and connecting said cylinder levers intermediate their ends.

27. In combination, a four wheel railway car truck having a truck frame with side members, a load carrying member connecting said side members, power means integrally formed within said load carrying member for operation of said brake rigging on one side of said truck, said rigging comprising live and dead truck levers supported on opposite sides of each wheel, cylinder levers supported intermediate said wheels and having corresponding ends respectively connected to the opposite ends of said power means, said cylinder levers having their opposite corresponding ends connected to said live truck levers, and a pull rod anti-frictionally supported on said load carrying member and connecting said cylinder levers intermediate their ends.

WALTER H. BASELT.